United States Patent
Bhagwat et al.

(10) Patent No.: US 6,563,517 B1
(45) Date of Patent: May 13, 2003

(54) AUTOMATIC DATA QUALITY ADJUSTMENT TO REDUCE RESPONSE TIME IN BROWSING

(75) Inventors: Pravin Bhagwat, Scarsdale, NY (US); Richard Yeh-whein Han, New York, NY (US); Richard Orville LaMaire, Yorktown Heights, NY (US); Todd William Mummert, Mahopac, NY (US); James Rubas, Yorktown Heights, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/236,622

(22) Filed: Jan. 29, 1999

Related U.S. Application Data

(60) Provisional application No. 60/102,944, filed on Oct. 2, 1998.

(51) Int. Cl.[7] .................................... G06F 15/00
(52) U.S. Cl. ........................ 345/735; 345/743
(58) Field of Search ............................. 345/734–739, 345/745, 762, 743, 742; 709/230, 221, 236, 203, 238; 707/10, 513

(56) References Cited

U.S. PATENT DOCUMENTS

| | | | |
|---|---|---|---|
| 5,764,235 A | | 6/1998 | Hunt et al. |
| 6,101,328 A | * | 8/2000 | Bakshi et al. ............... 345/735 |
| 6,215,774 B1 | * | 4/2001 | Knauerhase et al. ......... 370/252 |
| 6,237,031 B1 | * | 5/2001 | Knauerhase et al. ......... 709/221 |
| 6,247,048 B1 | * | 6/2001 | Greer et al. .................. 709/219 |
| 6,247,050 B1 | * | 6/2001 | Tso et al. ..................... 709/224 |
| 6,304,904 B1 | * | 10/2001 | Sathyanarayan et al. ..... 709/224 |
| 6,311,215 B1 | * | 10/2001 | Bakshi et al. ................ 709/221 |
| 6,343,350 B1 | * | 1/2002 | LaMaire et al. ............. 711/156 |
| 6,345,300 B1 | * | 2/2002 | Bakshi et al. ................ 709/229 |
| 6,345,303 B1 | * | 2/2002 | Knauerhase et al. ......... 709/238 |
| 6,378,053 B1 | * | 4/2002 | Lamaire et al. ............. 711/159 |
| 6,396,805 B2 | * | 5/2002 | Romrell ....................... 370/216 |

FOREIGN PATENT DOCUMENTS

| | | |
|---|---|---|
| JP | PUPA 1-211147 | 8/1989 |
| JP | PUPA 7-152668 | 6/1995 |
| JP | PUPA 10-124430 | 5/1998 |
| JP | PUPA 10-164092 | 6/1998 |

OTHER PUBLICATIONS

Han R Et Al: "Dynamic Adaptation In An Image Transcoding Proxy For Mobile Web Browsing" IEEE Personal Communications, US, IEEE Communications Society, vol. 5, No. 6, Dec. 1, 1998.
International Publication No.: WO 98 43177 A Oct. 1, 1998.
European Patent Application EP 0 811 939 A Dec. 10, 1997.

* cited by examiner

*Primary Examiner*—Steven Sax
(74) *Attorney, Agent, or Firm*—Ido Tuchman; Louis P. Herzberg

(57) ABSTRACT

The present invention provides methods, devices and systems for dynamically adjusting transcoding parameters so as to increase the benefits of transcoding. Methods of adaptation are designed to cope with the variability of network characteristics and of the size of transcoded images. The invention also provides a method and apparatus to enable the transcoding proxy to adjust a quality-size tradeoff on a per-image and/or a per-client basis. The adaptive transcoder chooses different parameters for each object, and provides performance improvements. The invention further provides a general framework for making policy decisions taking into account available bandwidth, content and type of image, and user preferences. The invention also includes methods for generating feedback about the choice of optimal transcoding parameters to the user.

45 Claims, 11 Drawing Sheets

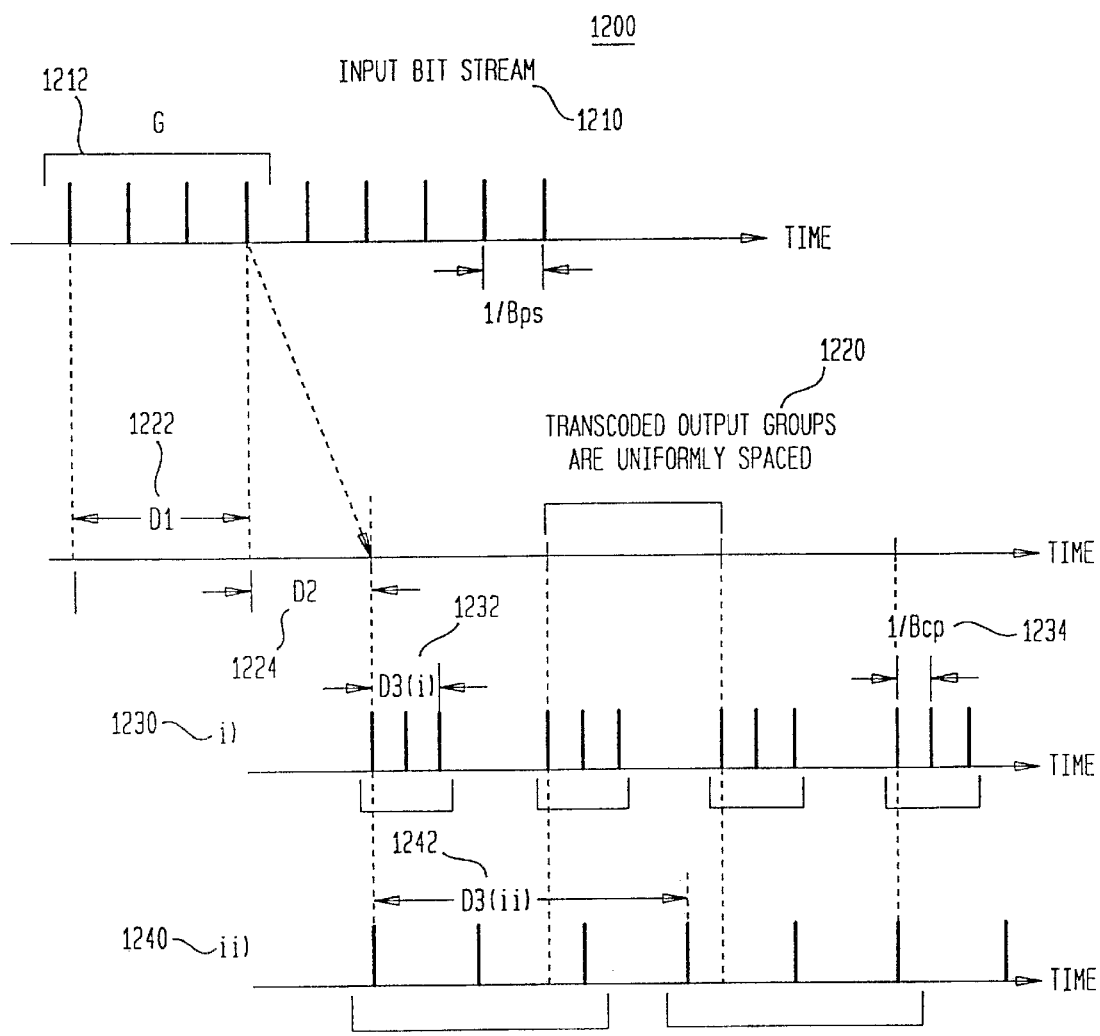

AUTOMATIC DATA QUALITY ADJUSTMENT TO REDUCE RESPONSE TIME IN BROWSING

CROSS REFERENCES

This application claims priority of U.S. Provisional Application, serial No. 60/102,944, filed Oct. 2, 98, having the same title and inventors. It is cross-referenced with U.S. Application serial No. 60/102,944, filed Feb. 13, 98, entitled, "Conserving Storage Space by Means Of Low Resolution Objects," by R. Lamaire, et. al., which is incorporated herein by reference in entirety.

FIELD OF THE INVENTION

This invention relates to browser proxies that transform image objects embedded inside documents. It is more generally related to any proxy or gateway system that processes MIME encapsulated objects and the the world wide web.

BACKGROUND OF THE INVENTION

Transcoding proxies sometimes act as intermediaries between web servers and a variety of client devices that are connected over communication links with widely varying characteristics. Generally, a transcoding proxy provides two major benefits: dramatic reduction in download times for low-bandwidth links, and tailoring of web data to the client device.

Mobile devices are frequently connected via low-bandwidth wireless or medium bandwidth wireline modem links that make the viewing of rich web content, such as images, very cumbersome due to the very long download times that result. In addition, the cost of such downloads can be prohibitive over tariffed wide-area wireless networks. Transcoding web proxies can reduce the size of web data while maintaining most of its semantic value. Download time reductions of six to ten times may be achieved for many typical web images without losing their intelligibility.

The second important benefit is that such an intermediate proxy is sometimes also capable of tailoring text and images for the multitude of small, weakly connected, but web-enabled, mobile devices that are now available. The capabilities of these mobile devices to receive, process, store and display web content varies widely. Given the variety of client devices, it is difficult for Internet content publishers to tailor content for the individual devices. Consequently, an active web proxy is used to transcode/change the web content to best fit the resolution, color-depth, and size constraints of a small-screened device and to reduce the size of the stored data to a fraction of its original size.

A typical transcoding web proxy may be implemented by adding a transcoding module in an HTTP proxy. The transcoding module is an input/output system that takes a data object (e.g., an image or HTML page) as input and transforms it into a low resolution object (e.g., a low-quality image or summarized HTML page) according to a set of chosen parameters. These parameters are input to the transcoder, which determines the resolution loss and size reduction of the object. The following discussion is mostly concerned with image objects.

To maximize the benefits of transcoding, it is important to choose the quality Vs. size tradeoff such that the best quality image is sent within the delay tolerance specified by the user. Choosing the right set of transcoding parameters, however, is difficult. First, it is hard to estimate the size of the transcoded image size because the degree of compression achieved through transcoding is content dependent. For example, some JPEG files can be compressed by up to 80% while others may only yield less than 5% compression. The same is true when GIF-to-GIF or GIF-to-JPEG transformations are applied. Since transcoding is a compute-intensive process, processing is only worthwhile when high compression ratios can be achieved. For images that are already well-compressed (or of low quality) transcoding may be wasteful.

Even if the size of the transcoded output can be predicted, network variability makes it hard to predict image download times. Since the user perceived quality and latency are the final performance measures, accurate estimates of download times are needed in order to choose the optimal point in the quality Vs. size tradeoff. Over best effort service networks, such as the Internet, accurate estimates of network characteristics (bandwidth, delay, loss rate) are hard to compute. Often the variance is so large that the statistical estimates are not meaningful for making any quality adjustments.

Another issue that makes policy decisions a complicated task is the location of the bottleneck in the network. When the path between the web server and the proxy is the bottleneck, transcoding does not help at all. On the contrary, it makes things worse due to the store and forward nature of the operation. Ideally, web proxies should stream images from web servers to clients whenever the server to proxy path is the bottleneck. Even in cases where the proxy to client path is the bottleneck, any benefit due to size reduction must be weighed against the store and forward delay incurred due to transcoding.

Due to the difficulty of estimating the network characteristics and image content, transcoding proxies may often only support adaptation at a very coarse level. Adaptation involves changing transcoding parameters which are usually selected from a predefined set of defaults, or chosen by the user. The problem with both approaches is that the full potential of transcoding is not utilized. Predefined static policies are unresponsive to changes in network bandwidth and user selectable policy decisions are likely to be sub-optimal due to the lack of knowledge about the state of the network. No method exists for providing feedback to the user about the combined state of the network and the proxy. Using iterative refinement, users can converge to the optimal choice of transcoding parameters, but such a process is time consuming and not very user-friendly.

FIG. 1 shows an example transcoding proxy scenario 100 with varied links and varied client devices. As shown in FIG. 1, we consider an example scenario in which all of the web requests and responses for clients 130–134 are passed through a generic (Hypertext Transfer Protocol) HTTP proxy 190. In the example scenario of FIG. 1, it is the downloading of large data objects, primarily images, over the last link 160–164 from the proxy to the client that typically is the main source of delay in the end-to-end response time experienced by the clients 130–134.

The transcoding proxy 190 provides massive data thinning of web data to enable real-time browsing of web data over low-speed wide-area wireless links, like Cellular Digital Packet Data (CDPD) 163 that provides 10 kb/s or less of throughput, depending upon the number of clients sharing the link. The end client could be a full-function PC 134 with a good color display, so that the primary problem is bandwidth reduction. Alternatively, the client might be a small, web-enabled, mobile devices 130–132 in which case it is advantageous to tailor the web data for the specific client device, particularly the client's display characteristics. Different aspects of transcoding proxy design benefit different scenarios (i.e., tariffed proxy-client link, strong/weak client display, etc.), but all are handled well within the same proxy architecture 100.

FIG. 2 shows a block diagram of an embodiment of transcoding proxy 190 used to transform objects based on user specified preferences and static policies. A transcoding proxy 190 is built by combining a transcoding module 240 with an HTTP proxy engine 220. An HTTP request 222 originates from a client 230 and is forwarded 224 by the proxy 190 to a web server 210. The response data 226 (i.e., HTML pages and GIF and JPEG images) are transformed by the transcoder 240 and then forwarded 228 to the client 230. Typically, a number of transcoding parameters are specified to the transcoder 240 in order to achieve the desired quality/ size reduction of the object contained in the response data 226. Transcoding proxies in use today either use a static set of policies 250 or use some form of user specified preferences 260 via path 265 to determine the transcoding parameters. When a fixed set of transcoding parameters are applied to all objects, results are not always beneficial. In fact, in many cases, transcoding leads to poorer performance.

SUMMARY OF THE INVENTION

An aspect of the present invention is to provide methods, devices and systems for dynamically adjusting transcoding parameters so as to increase the benefits of transcoding. Methods of adaptation are designed to cope with the variability of network characteristics and of the size of transcoded images.

In an embodiment, the invention includes three new components: an image size predictor, a network bandwidth (b/w) analyzer, and a policy module. Before initiating any transcoding action, the policy module queries the image size predictor to estimate the size of the output image. The b/w analyzer is queried to collect an estimate of the image transmission time from the server to the proxy, and from the proxy to the client. Based on the collected estimates, the proxy decides whether or not to transcode the image. In addition, the policy module can also compute the optimal point in the quality vs. size tradeoff that would provide the user specified performance criteria (e.g., reduced response time, increased quality).

Another aspect of the present invention is to provide a method and/or apparatus to enable the transcoding proxy to adjust a quality-size tradeoff on a per-image and/or a per-client basis. The adaptive transcoder chooses different parameters for each object, and provides performance improvements.

Still another aspect of this invention provides a general framework for making policy decisions taking into account available bandwidth, content and type of image, and user preferences. The administrator of the proxy chooses from a variety of optimization objectives so as to obtain improved performance from the system. In one embodiment when the proxy transcoder throughput is the bottleneck, the policy module is instructed to judiciously use CPU resources so as to reduce the response time for all users. An advantageous element of the invention is the automated nature of decision making, to free up users from actively controlling the policy engine of the proxy.

In still another aspect of the present invention a method is provided for generating feedback about the choice of optimal transcoding parameters to the user. In an example of embodiment, the transcoding system provides feedback to the user by dynamically adjusting the position of the user preference slider bar. The user preference slider bar serves both as an input as well as an output device.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 12 illustrates an example timing diagram of streaming transcoding in accordance with the present invention.

DESCRIPTION OF THE INVENTION

Figure 1:
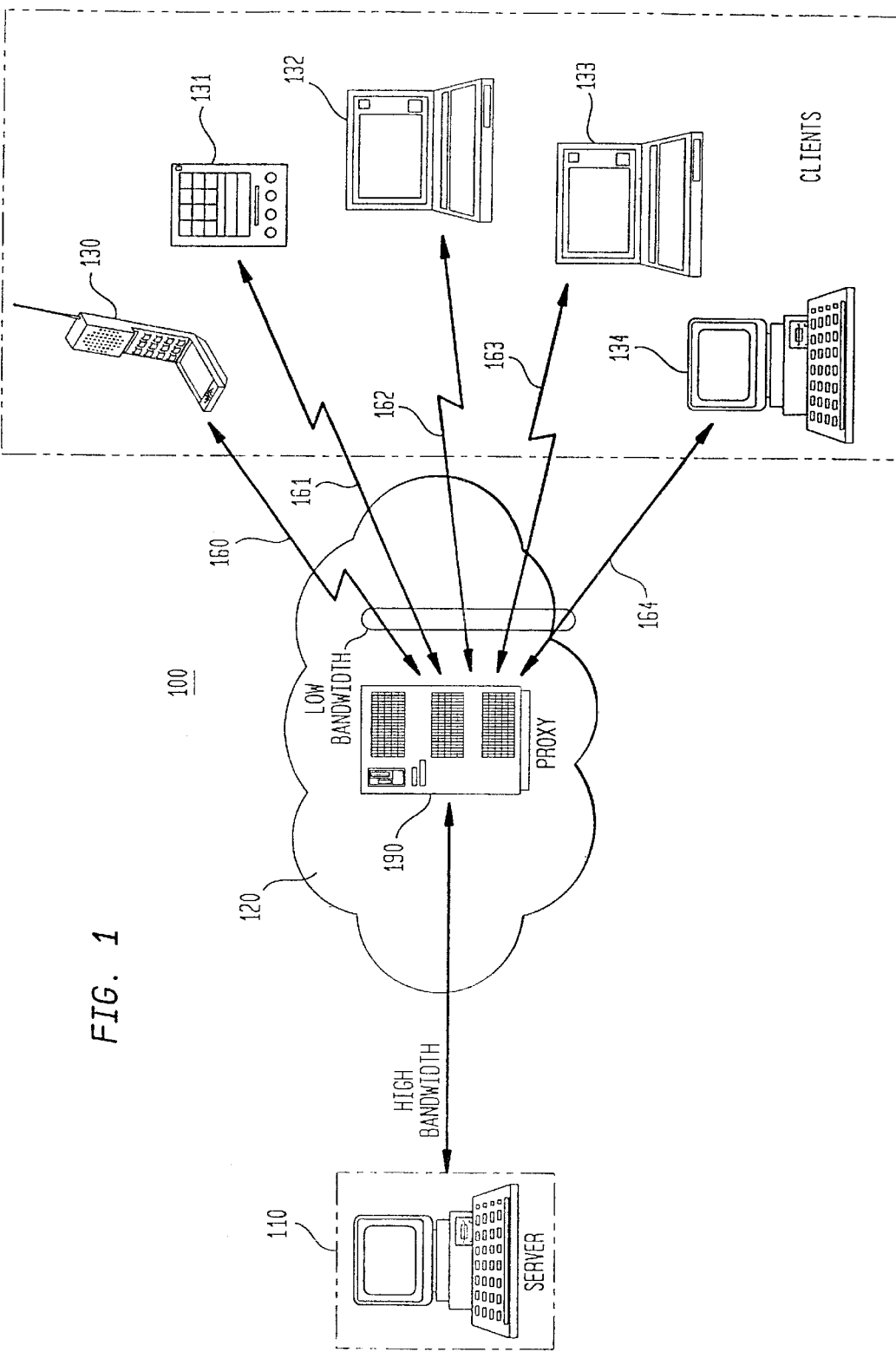
FIG. 1 shows an example transcoding proxy scenario with varied links and varied client devices.
Figure 2:
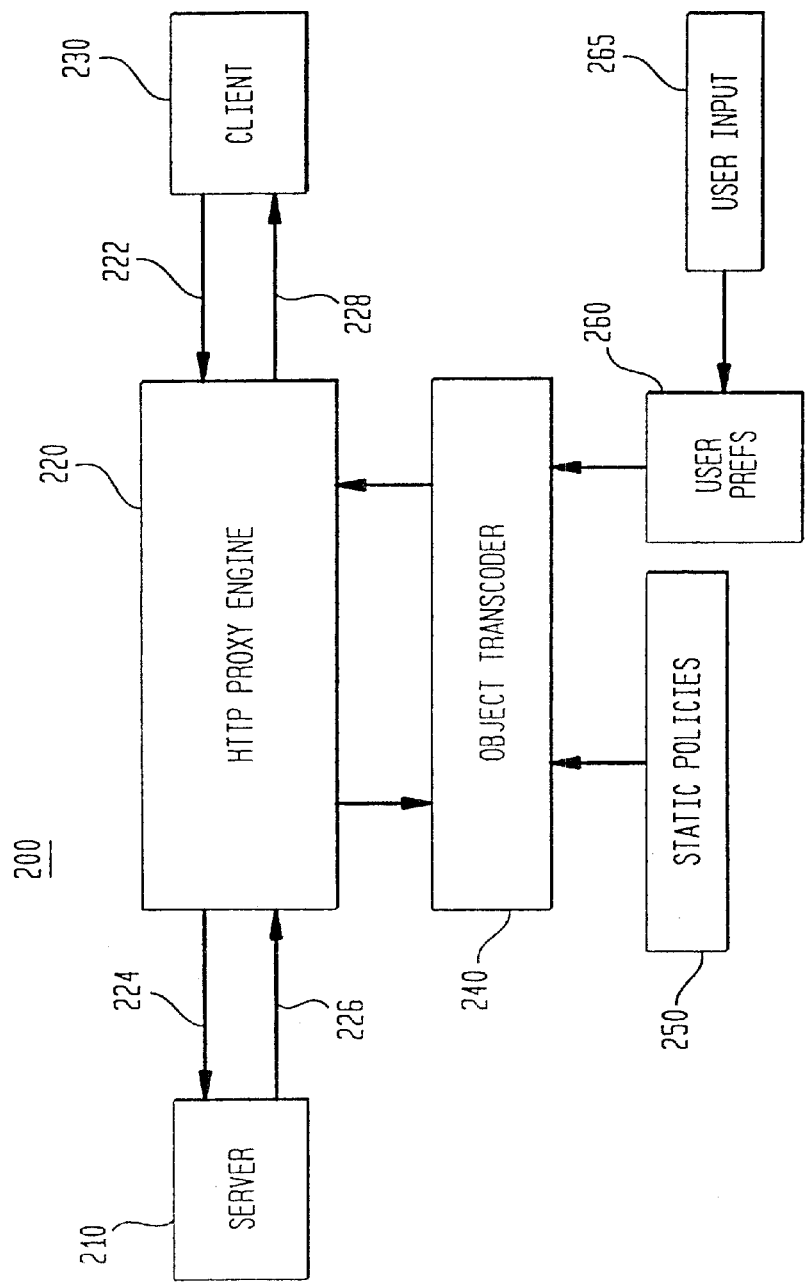
FIG. 2 shows a block diagram of a transcoding proxy used to transform objects based on user specified preferences and static policies.
Figure 3:
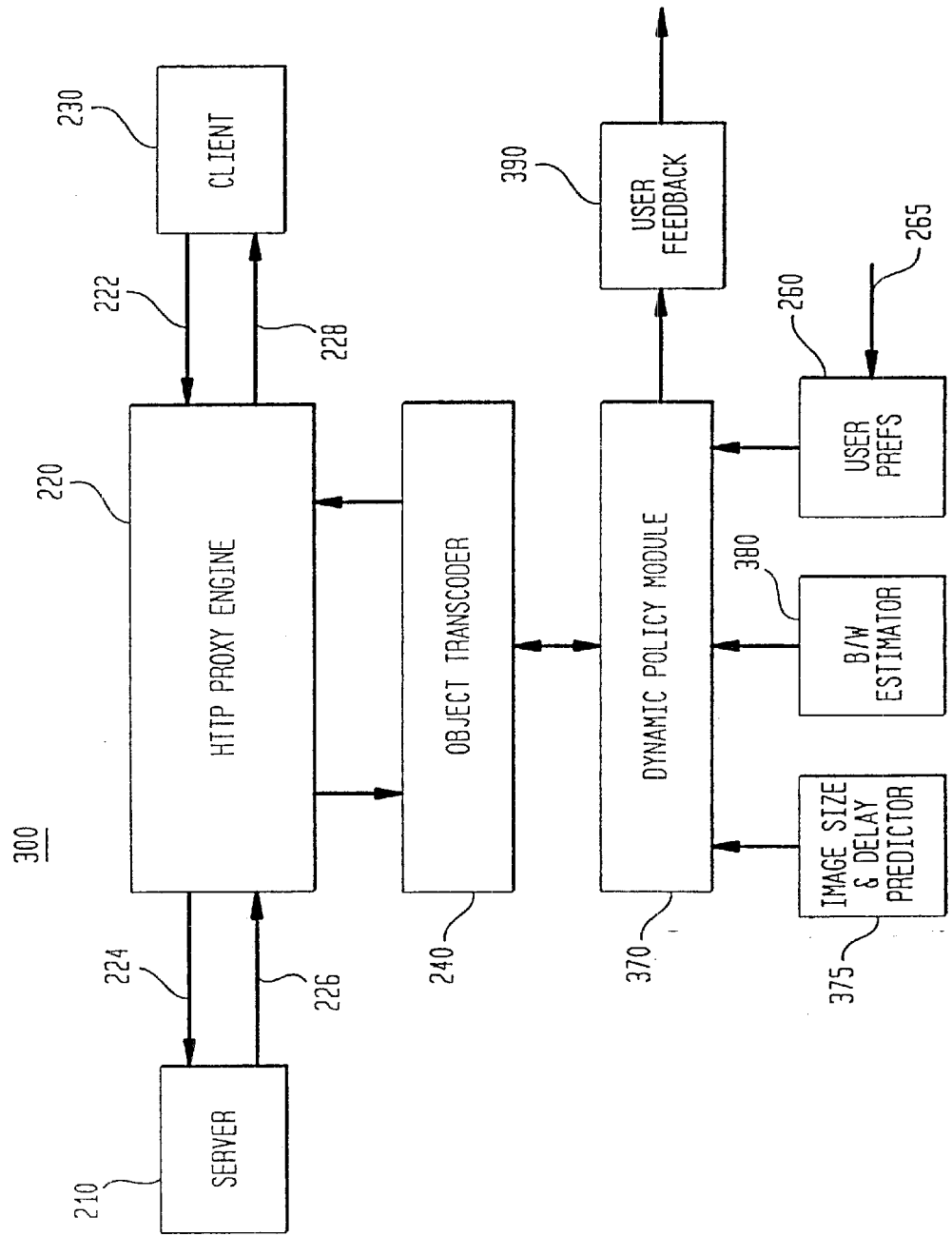
FIG. 3 shows a block diagram of an example of a transcoding proxy modified in accordance with the present invention to include an image size predictor, bandwidth estimator, dynamic policy module, and a user feedback generator.
Figure 10:
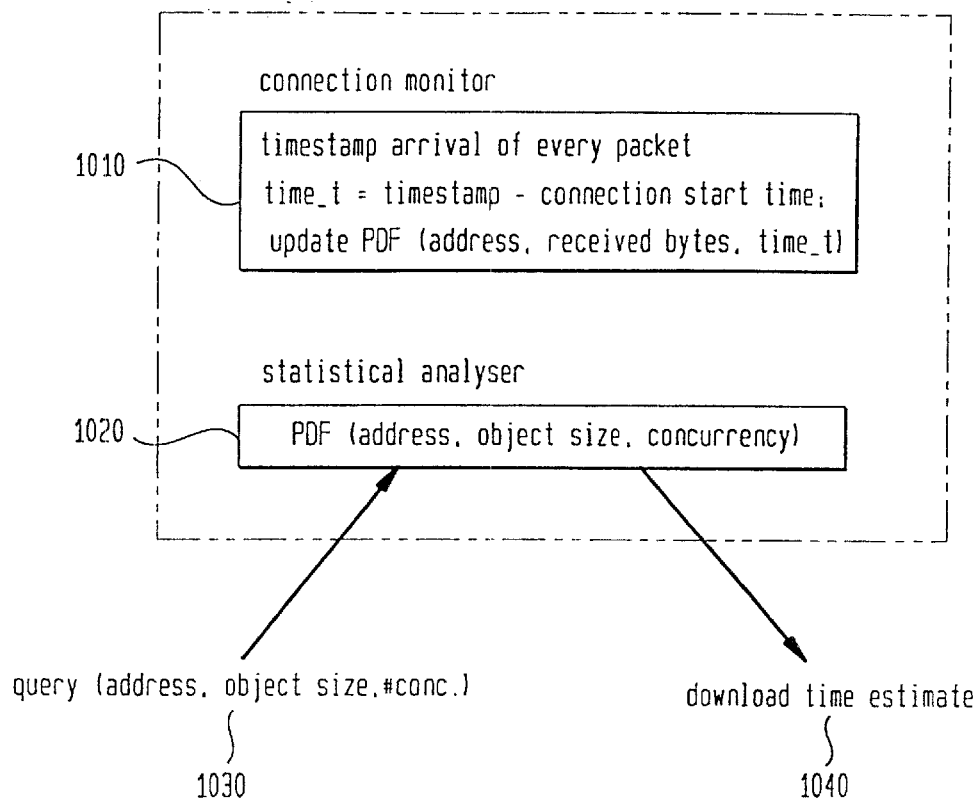
FIG. 10 shows an example block diagram of an example bandwidth prediction module in accordance with the present invention.
Figure 11:
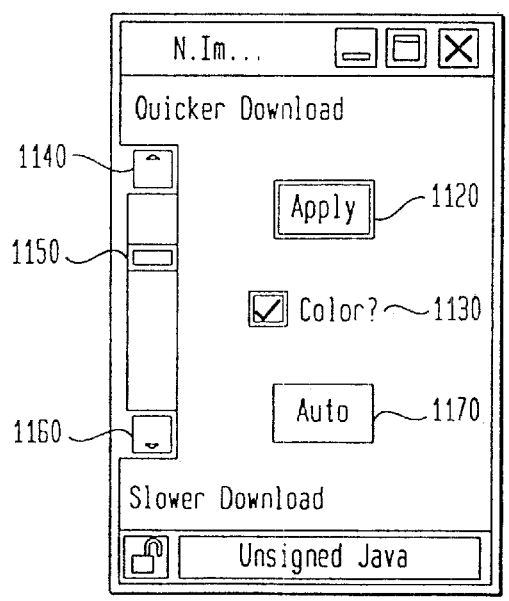
FIG. 11 shows input/feedback user interface in accordance with the present invention.

FIG. 3 shows a block diagram 300 of an example embodiment of changes to transcoding proxy 190 in accordance with the present invention. A comparison of FIG. 3 to FIG. 2 shows a replacement of the static policy module, 250 in FIG. 2, with a dynamic policy module, 370 in FIG. 3. A purpose of the dynamic policy module 370 is to make decisions concerning when to turn transcoding on and off and what transcoding policy (i.e., the transcoding algorithm along with its parameters) to use. The dynamic policy module 370 also interfaces with an image size and delay predictor 375, a bandwidth estimator 380, and a user feedback provider 390. In the embodiment shown, the policy module 370 employs a number of criteria, including:

1. the characteristics of the data (e.g., size of the images, current encoding efficiency, structural role in the HTML page) as determined by the content analysis flow diagram (shown in FIG. 5),
2. the current estimate of the bandwidth on the proxy-to-client and server-to-proxy links (shown in FIG. 10),
3. the characteristics of the client, particularly the client display capabilities, and 4. the user preferences concerning the preferred rendering of the data (shown as the user slide bar preferences in FIG. 11).

Figure 5:
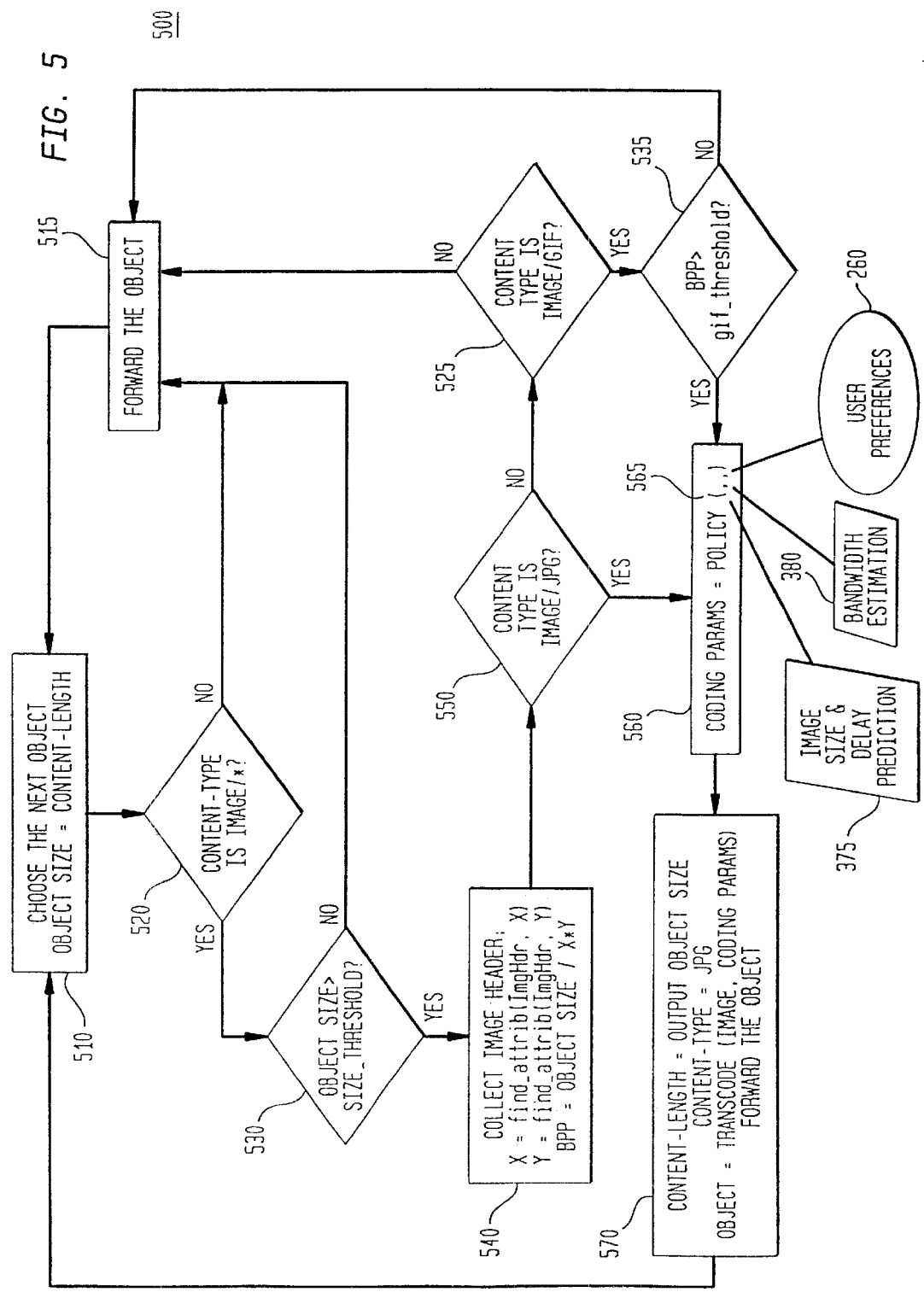
FIG. 5 shows an example flow diagram of a transcoding dynamic policy module in accordance with the present invention.

The items shown in FIGS. 5, 10 and 11 are described below. In particular, the user slide bar preferences of FIG. 11, provide a method of interacting with the transcoding proxy so as to dynamically change the tradeoff between image quality and download time. In addition to serving as an input interface, the slider bar (1140 1150 1160 of FIG. 11) also acts as an output interface, displaying the feedback 390 that is received from the dynamic policy module 370.

Figure 4:
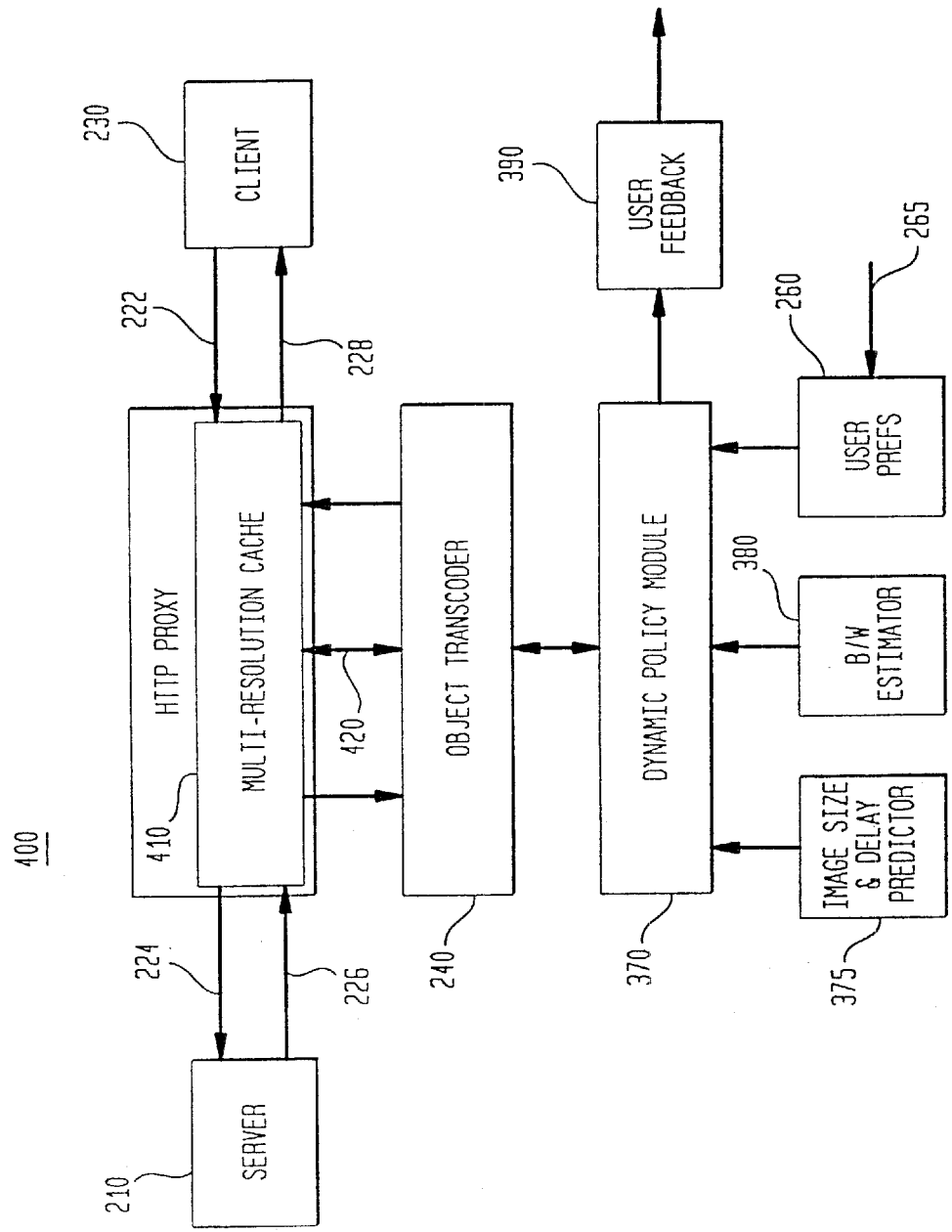
FIG. 4 shows an example block diagram of an example HTTP proxy with caching and transcoding modules in accordance with the present invention.

FIG. 4 shows a block diagram 400 illustrating an example function of a multi-resolution cache 410 in a transcoding HTTP proxy system 400 in accordance with the present invention. Caches are useful in HTTP proxies to provide reduced response time for repeated data requests (by the same or different clients) for the same data object. A variety of methods may be used to assure that the cached data is up-to-date. In the example caching transcoding system 400, the multi-resolution cache 410 stores an original version of the data, as well as other possible forms of the data, including reduced resolution versions that have been transcoded for specific device types.

As an example, we again consider the case of an image data object, but it is understood by those skilled in the art that these methods can be applied to other data types. We describe a method for storing, tagging and retrieving various forms of the data in the context of a caching transcoding proxy system.

Referring to FIG. 4, it is assumed that a JPEG image is received from the server 210 in response to a request by a client 230. This image is decoded from the lossy JPEG encoding format to a bit-map representation of the image. Those skilled in the art of image processing recognize that the JPEG encoding standard describes images using coefficients that weight Discrete Cosine Transforms (DCTs) so a compute-intensive decoding step is generally required to obtain the actual colors of each pixel. This bit-map requires a larger storage size than the original JPEG image. However, given an adequate size cache it may be worthwhile to store (via data path 420) this expanded size image so as to avoid the compute-intensive step of JPEG decoding when a transcoded version of the same image is later required but with different transcoding parameters than the first request. In a second step, based on the transcoding parameters (i.e., color depth, scaling factor, and the JPEG quality factor) the JPEG image is re-encoded. The image may be re-encoded as a JPEG image or in an alternative encoding format. The final transcoded version of the image is also stored in the multi-resolution cache 410 via data path 420.

In the example embodiment, when additional data requests occur, the HTTP proxy 220 first checks its cache 410 to see if an "up-to-date" version of the data object is available at the requested resolution or transcoding level. Each object in the multi-resolution cache 410 is stored with a version specifier that includes: a URL description, a time stamp for the data object, and the object characteristics. For a JPEG image the object characteristics include color-depth, scaling factor, and JPEG quality factor. An alternative embodiment has an indication that the JPEG image has been decoded and stored in its bit-map form, or that it has been converted and stored as a GIF with various characteristics.

If an up-to-date version of the object is available with the requested type and resolution, then that version is returned to the client. If this is not available, but an up-to-date version of the object exists in either its original JPEG form or the decoded bit-map form, then this version is returned to the transcoder 240 with an indication of its characteristics. This enables the transcoder 240 to produce the desired version of the object, which is returned to the client 230 and stored in the multi-resolution cache 410 via data path 420.

It is noted that there are several extensions to this scheme that are obvious to those skilled in the art. One extensions uses an already transcoded version of the object, rather than to the original data object, to generate a further resolution-reduced version of the object. Methods for managing the different resolution versions of data objects in a cache are further described in R. O. LaMaire and J. T. Robinson, "Conserving Storage Space by Means of Low Resolution Objects", serial No. 60/102,944, filed Feb. 13, 98, which is cross-referenced above to this application.

FIG. 5 shows an example flow diagram for the dynamic policy module 370 of FIGS. 3 and 4. FIG. 5 also shows how the policy module 370 interfaces with the HTTP proxy engine 220 and the object transcoder 240 of FIG. 3. The methods described below apply to many content types including text, images, audio, and video. However, the following discussion focuses on image data types only. It is evident to those skilled in the art that concepts and dynamic policies are applicable to other media types.

FIG. 5 shows that based on the response header received from the server 210, the HTTP proxy engine 220 first determines the size of the object 510. If the content-type of the response is "image/*" 520, the proxy engine 220 passes the handle for the object to the dynamic policy module 370 for further analysis. Inside the policy module 370, the size of the input object is compared against a pre configured threshold called "size_threshold" 530. If the objects is smaller than "size_threshold", or the content type is not "image/*" 520, then the object is not transcoded, but instead is forwarded 515 to the client without any content modification. Small objects (such as bullets, thumbnails, logos, etc.) found on the web are typically GIF objects which are already well compressed due to GIF encoding. Transcoding such objects does not generally yield further compression.

We convert GIF images to GIF or JPEG images that are reduced in size and/or color-depth (the choice of GIF or JPEG as the end format depends on the image characteristics). In addition, we convert JPEG images to JPEG images that are reduced in JPEG quality, size, and/or color-depth. JPEG quality refers to a transcoding parameter that is used to determine the degree to which the coefficients of the Discrete Cosine Transformations used in the JPEG encoding standard are quantized. It has been found that the JPEG quality parameter is also a good predictor of perceived image quality. This parameter varies in the range 1 to 100, where 100 represents very high quality. JPEG images found on the web typically have a JPEG quality parameter of 75.

For large images, the type of the image coding (JPEG or GIF) and the efficiency of coding are important factors in transcoding decision making. Since JPEG is a lossy compression method, size reduction is always possible by reducing quality factor. Similar quality reduction, however, cannot be applied to GIF files since GIF is a lossless compression method. To achieve quality reduction, a GIF file must first be decoded and then re-encoded as a quality-reduced JPEG image. This method, however, may not always provide size reduction. GIF format is usually more efficient for coding maps, logos, and drawings while JPEG is more efficient for coding natural images. Converting GIF to JPEG is useful only when the original GIF image is not efficiently coded.

We define bits per pixel (bpp) as a measure of the compression efficiency. Bpp is computed as the ratio of the image file size to the image area in pixels. In processing step 540, X and Y dimensions and the bpp value of the input image are computed by parsing the image header. If the input object is of type "image/jpg" 550, transcoding is always performed. However, if the content type is "image/gif" 525, only those objects which yield a bpp ratio larger than "gif_threshold" 535 are transcoded. GIF files that are not very efficiently encoded yield a bpp value that is larger than "gif_threshold". Thus, the decision step 535 is very effective in identifying compressible GIF files with high accuracy. Though not show in FIG. 5, it is evident to those skilled in the art that other transcoding policies, such as scaling and file truncation (for progressively encoded data) can be used for well-compressed GIFs.

An important aspect of the proposed invention is that decision steps 510–565 are carried out as soon as the image header is received. If the decision is to not transcode, image segments can be forwarded as soon as they are received from the server without incurring store and forward delay. Similarly, when transcoding is to be performed, images can either be buffered and then transcoded (store and forward transcoding), or each segment can be transcoded on-the-fly (streaming transcoding method).

After identifying an image that is compressible, the next step involves determining the extent to which the selected image should be transcoded. The policy function 565 is responsible for collecting input from three different sources (image size predictor 375, bandwidth estimator 380, user preference selector 260) and subsequently selecting transcoding parameters in accordance with the steps shown in FIG. 8. The chosen parameters determine the extent and types of compression performed by the object transcoder 240. For example, the scaling parameter determines how much an image is downsampled. Quantization parameters control how an image is quantized in the pixel domain and/or the frequency domain. The number of colors in a color mapped image can be reduced, or a 24-bit color image may be converted to 8-bit grayscale, or even a monochrome representation. The process of transcoding is performed in step 570 and the output of the transcoder is forwarded to the client 230.

An important aspect of the policy function 565 is the analytical framework for making transcoding decisions. The analytical framework takes into consideration factors such as available bandwidth, type and size of the image, user preferences and provides an objective criteria for making transcoding decisions. As an example, we consider the objective of minimizing response time for the user, but it is understood by those skilled in the art that using the same framework other optimization criteria can also be applied. We describe a method for determining when it is beneficial to transcode, and to what extent transcoding should be applied. The embodiment described herein is referred to as dynamic adaptation of transcoding parameters.

Figure 6:
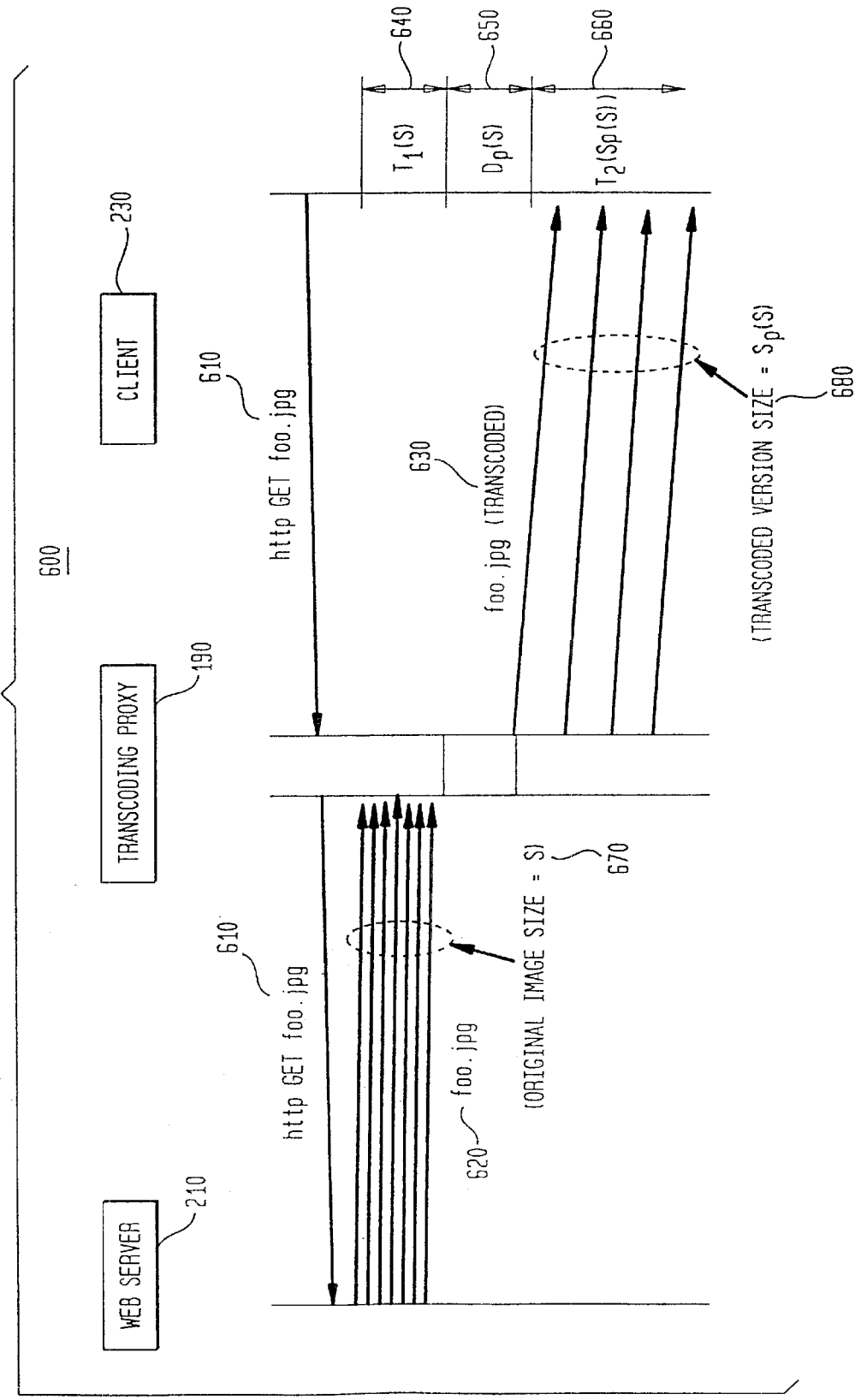
FIG. 6 shows an example web request-response cycle using a transcoding proxy in accordance with the present invention.

FIG. 6 shows an example web request-response cycle and the response time of fetching an object of size S through a store-and-forward transcoding proxy 190. We define a store-and-forward image transcoder as an image transcoder which must wait to accumulate an entire input image before transcoding can begin on this image and then must wait to generate a transcoded image in its entirety before it is made available to be output. As shown in FIG. 6, the original image 620 of size S (bytes) 670 is downloaded into the store-and-forward proxy over the server-proxy connection with effective bandwidth $B_{sp}$ (bits/sec). The transcoder introduces a delay $D_x(S)$ 650 and generates an output image 630 of size $S_x(S)$ 680. Both the transcoding delay 650 and output image's byte size 680 are denoted to be dependent upon the input image's byte size S 670. The transcoded image is then transmitted over a proxy-client connection having effective bandwidth $B_{pc}$.

Figure 7:
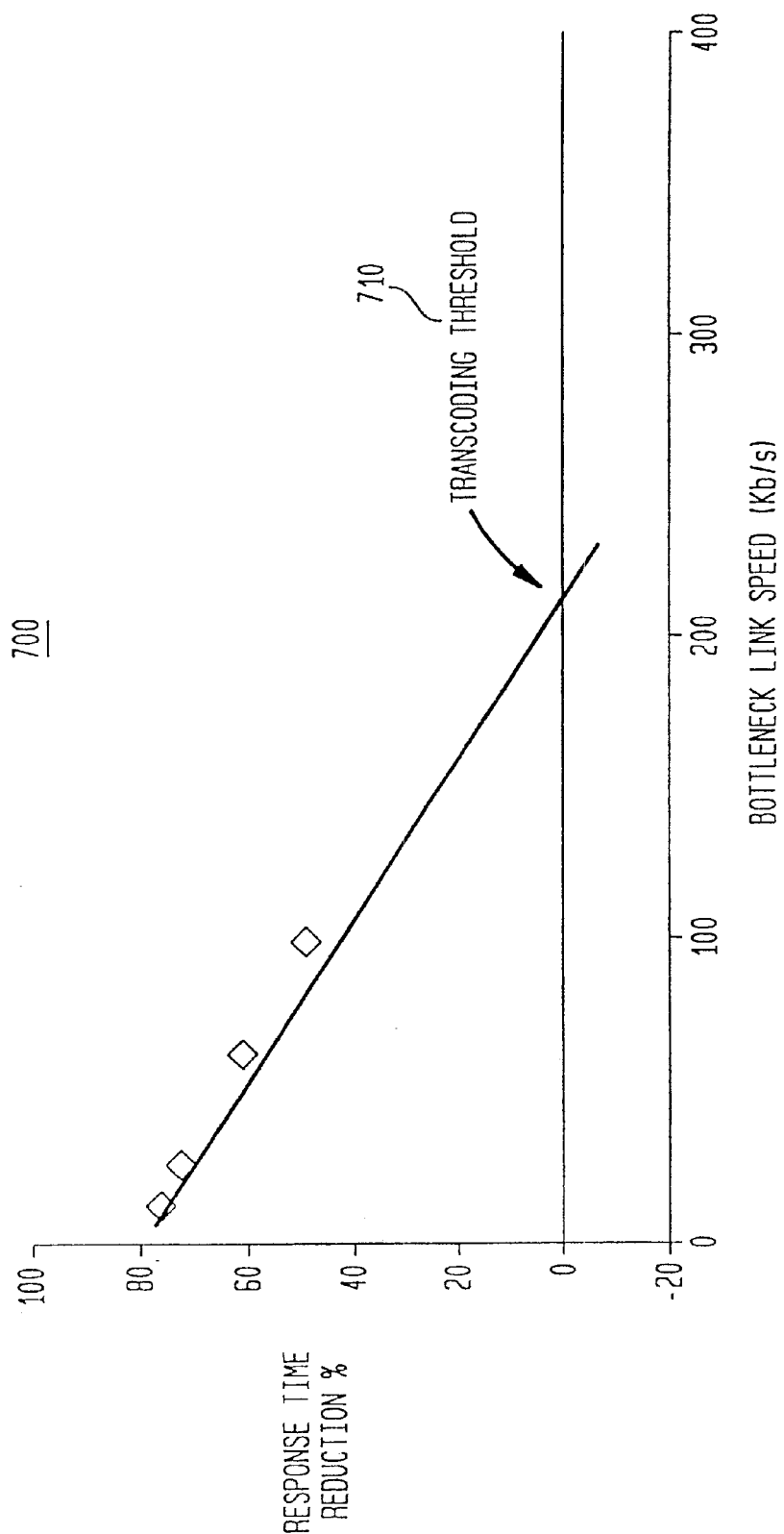
FIG. 7 shows an example regime where transcoding is useful in accordance with the present invention.

The policy function needs to weigh the cost (delay) of transcoding against any size reduction achieved by transcoding. For transcoding to provide benefits, delay introduced due to transcoding must be offset by the reduction in transmission time due to compression. For very low bandwidth proxy-client access links, the reduction in response time due to aggressive image compression typically far outweighs the addition to response time caused by compute-intensive transcoding. However, FIG. 7 shows that as the bandwidth of the proxy-client link increases, there comes a point (transcoding threshold 710) at which it is no longer beneficial to transcode since the reduction in response time due to aggressive compression decreases as a function of the bottleneck link's bandwidth, while the transcoding time remains constant.

Suppose $R_o$ is the response time of fetching a web object of size S from the web server with transcoding turned off. Similarly, let $R_p$ denote the response time of fetching the transcoded version of the same web object through the transcoding proxy. For the purpose of the following discussion we assume that caching is not supported at the proxy.

The client perceived response time with transcoding turned off is the sum of the following three terms:

$$R_o = 2 \cdot RTT_{pc} + 2 \cdot RTT_{sp} + \frac{S}{\min(B_{oc}, B_{sp})}$$

$RTT_{pc}$ is the network roundtrip time latency between the client and the proxy and, similarly, $RTT_{sp}$ is the latency between the proxy and the server. Fetching the Web object requires a TCP SYN/ACK exchange as well as an HTTP request/response, thereby contributing $2*RTT_{pc}+2*RTT_{sp}$ to the delay term. In addition, a Web image incurs a transmission delay equal to the spread in time between arrival of its first and the last bits. Let $\min(B_{pc},B_{sp})$ denote the bottleneck bandwidth between the client and the server. In the absence of a proxy, the first and the last bits of an image will be spread in time by $$\frac{S}{\min(B_{oc}, B_{sp})}$$

This spread corresponds to the effective transmission time of the image over the concatenated server-to-proxy-to-client connection.

When transcoding is turned on, the proxy operates in a store and forward mode. $2*RTT_{pc}+2*RTT_{sp}$ is again the fixed component of the response time. $D_p(S)$ is the additional term that represents the transcoding delay. The resulting response time for the transcoded object can be expressed as:

$$R_p = 2 \cdot RTT_{pc} + 2 \cdot RTT_{sp} + D_p(S) + \frac{S}{B_{sp}} + \frac{S_p(S)}{B_{pc}}$$

Transcoding will reduce response time if $R_p<R_o$. That is, $$D_p(S) + \frac{S}{B_{sp}} + \frac{S_p(S)}{B_{pc}} < \frac{S}{\min(B_{pc}, B_{sp})}$$

Clearly, when $B_{pc} > B_{sp}$, $R_p$ is always greater than $R_o$. On the other hand, when $B_{pc} < B_{sp}$, transcoding is useful if and only if $$D_p(S) + \frac{S}{B_{sp}} < \frac{S - S_p(S)}{B_{pc}}$$

Figure 8:
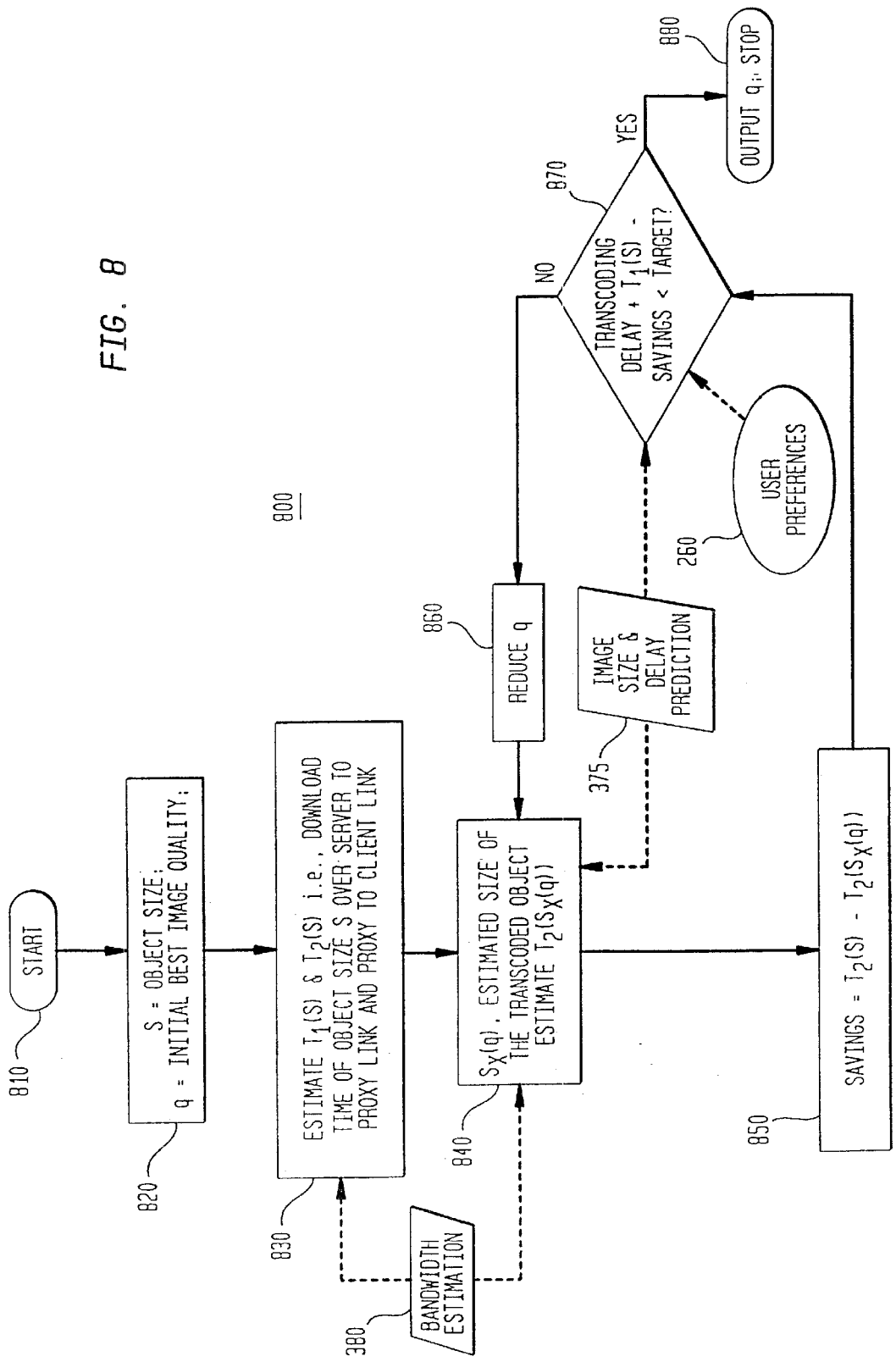
FIG. 8 shows an example flow diagram of a example policy function in accordance with the present invention.

The above equation precisely characterizes the regime in which transcoding reduces response time. FIG. 8 shows a flow diagram of an example policy function constructed using the analytical framework described above. 810 marks the entry point of the policy function. The policy function 800 is called from 565 with the original image object size as one of the inputs to the policy function. Variable S is set equal to the input object size and the quality factor q is initialized to the best possible initial image quality (for example, the quality of the input image). In step 830, the policy function 800 issues a query to the bandwidth estimator 380 asking for the estimated download time of the object size S from the specified server to the proxy, referred to as $T_1(S)$. It also asks for the estimate of the download time for the same object from the proxy to the client, referred to as $T_2(S)$. Based on the logs of previous connections to the chosen destination, the bandwidth estimator returns an estimate of $T_1(S)$ and $T_2(S)$. In the next step 840, the policy function queries the image size & delay predictor 375 to find an estimate of the transcoded image size $S_p(S)$. It then computes the estimated download time savings by subtracting the download time estimate of the transcoded image size $T_2(S_p(S))$ from $T_2(S)$ 850. Finally, in step 870 the two quantities (transcoding delay+$T_1(S)$–the download savings) and the target response time reduction are compared. If the first term is less than the second term, computation is stopped and the chosen quality factor q is returned as an output 880. Otherwise, the loop 840–870 is reentered with a reduced q value.

It is noted that more efficient search techniques or variants of objective functions can be designed by those skilled in the art without departing from the spirit of the policy function framework presented in this invention. One extension would be to rearrange the terms in the policy equation as follows:

Response time reduction$(q)=\{S-S_p(S)\}/B_{pc}-D_p(S)-S/B_{sp}$

In the above equation, $S_p(S)$ is also a function of the quality factor (the smaller the output size, the poorer the quality). Note that the transcoding delay has been found to be effectively independent of the quality factor. There are two independent variables in the above equation: q, the quality factor, and the target response time reduction. Several different policies can be developed within the framework of the above equation. For example:

Minimize response time for all users,

Maximize quality for a user specified response time constraint,

Optimize overall system performance, not just one user.

Since transcoding is a compute-intensive task and the proxy only has limited CPU power, the proxy's CPU cycles are best spent on the set of tasks that maximize overall user satisfaction. During the peak usage period, if every user turns transcoding on, there may not be sufficient CPU cycles available to satisfy all transcoding requests. By delegating the responsibility of parameter selection to the policy function 800, the system can automatically select the optimal transcoding parameters and provide consistent and predictable response to the end user. If users were to select these parameters independently, the transcoding system could not operate at the optimal performance level.

Let us now consider the transcoding delay and size estimation. The decision step 870 requires two additional inputs: an estimate of the size of the transcoded image, $S_p(S)$, and the transcoding delay, $D_p(S)$, that is incurred during the process of transcoding. An accurate prediction of these two quantities is difficult to obtain since they depend on the image content, type of coding used, original quality factor, processor speed, and the load on the proxy. As was the case for the bandwidth estimators, the present invention uses statistical methods to estimate these two quantities.

Figure 9:
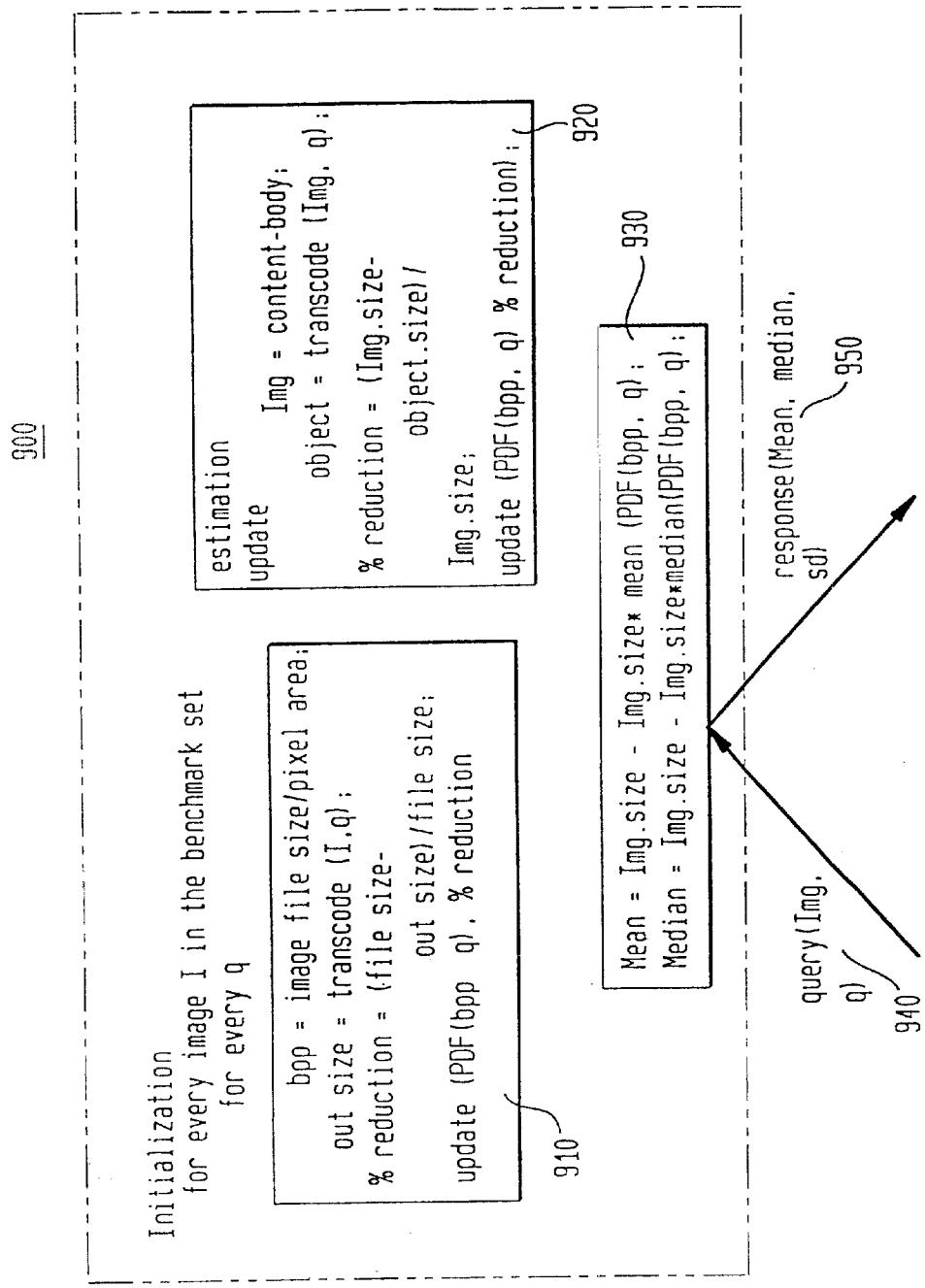
FIG. 9 shows an example block diagram of an example image size prediction module in accordance with the present invention.

FIG. 9 is a block diagram of an example of the image size prediction module in accordance with the present invention. As shown in 910, we initialize our system with statistical characterizations of $S_x(q)$ that are based on a large benchmark set of images. The method shown in 910 is used to initialize the transcoded image size distribution functions that depend on the parameters bpp and q. The proxy continually adds new sample points 920 to the distribution function as it fetches and transcodes new image objects. The function of 920 enables the image size predictor 375 to adapt its behavior to different data sets that a client may be accessing.

Thus, in the method described in 930, we use statistical methods to estimate the delay and output size and use the bpp ratio as the criteria for performing a more accurate classification of images and hence of forming a better estimate of the resulting transcoded file size. This method works particularly well for GIF files.

Using similar statistical methods, $D_p(S)$ can be estimated based on benchmark initialization and on-line updating of the statistical model. We have also determined from our statistical work, that the transcoding delay is well characterized as being a linear function of the number of pixels (as opposed to file size).

Now we consider the bandwidth and download time estimation. The accuracy of decision step 870 also depends to a large extent on the accuracy of image download time estimates. Bandwidth estimator 380 shown in FIGS. 3–5 is responsible for providing these time estimates. The bandwidth estimator 380 records every packet send and receive event at the proxy and performs statistical analysis on the collected traces to make predictions about the state of the network. Those skilled in the art of network monitoring recognize that the network monitoring function can be implemented in several different ways. One implementation would be a shim layer between the proxy application and the socket layer. Another implementation would be a processing layer above any packet filtering software. Generally the implementation built over the packet filtering software will provide more accurate estimates of bandwidth and download time. The present invention presents no requirement that the bandwidth monitor 380 and the policy decision step 870 should both run on the same machine, though collocating the two modules minimizes the overhead of communication between them.

FIG. 10 shows an example bandwidth estimator module 380 in accordance with the present invention. The module consists of two components; trace monitor 1010 and a statistical analyzer 1020. The trace monitor continuously monitors all connections between the clients and the proxy. The same trace monitor (or another instance of it) is also used to monitor the traffic between the proxy and all web servers. For each monitored connection the following information is recorded:

time when a new connection is established, source address, source port number and destination address, destination port number of each network connection, number of bytes sent and received on each connection and the respective timestamp of each send and receive event, time when connections are closed.

The statistical analyzer 1020 maintains a database of all past and all current active connections. For each connection it also keeps a history of when and how many bytes were sent and/or received on that connection. Based on this history the statistical analyzer 1020 is able to make predictions about the download time of future connections. For predicting server to proxy download time and proxy to client download time we use different heuristics.

Server to proxy traces exhibit behavior that is common among wide-area TCP connections. It has been observed that sequence Vs timestamp traces are non-linear and we have found that linear estimation concepts such as average or median bandwidth don't yield accurate estimates. To predict the download time of an object of a given size, bandwidth estimator looks at the history of connections to the chosen destination and computes the distribution function of the download time for all objects that have roughly the same size. The median, or some other appropriate statistical function of this distribution, is returned as the download time estimate.

In contrast, proxy-to-client TCP behavior is dominated by the effects of having a bandwidth constrained link, which is typically the last hop 160–164. Because there is a bottleneck link, the aggregate of all active TCP connections to a client typically saturate the bottleneck link. Thus, for providing proxy to client download time estimates, bandwidth estimator aggregates all active connections to a client into a single group. For each group of connections it plots a time vs number of bytes plot and then performs a linear curve-fit on the data. This technique provides accurate estimate of the current available bandwidth between the proxy and the client. Although this value changes with time, the oscillations in most cases are bounded. For example, bandwidth monitor can easily detect whether the client is connected by a 10 Mb ethernet, 14.4 modem, or 28.8 modem by analyzing the output of the curve fitting algorithm. The predicted values are not exact (20–30% deviation from the correct values), but those skilled in the art recognize that accuracy of bandwidth estimation can be improved by refining the estimation algorithm.

Consideration is now given to the transcoding user interface. Transcoding user interface is the interface through which the user can dynamically change the tradeoff between image quality and download time. It is represented as the item 260 in FIGS. 2–5. FIG. 11 shows an example implementation of the user preference interface in accordance with the current invention. This user interface is represented well as a linear slide bar, which can be implemented as a Java applet, to allow users to continuously vary the image quality. As shown in FIG. 11 an option for selecting color (vs. gray scale) is also provided. Further, an option for selecting autopilot can be used in the following two ways: 1) as an indication to the proxy that it can automatically decide whether or not to perform transcoding, based on the current estimates of the client-proxy and proxy-server link bandwidths and currently available CPU resources as discussed above, or 2) as an indication to the proxy to try and maintain the current download times that the user is currently experiencing (i.e., by varying image quality at the proxy to compensate for dynamic bandwidth changes that are detected by the bandwidth estimation subsystem), or both 1) and 2). On occasions when the user requires a full-fidelity version of the data, they can easily request the refined data by adjusting the slide bar (downwards) and requesting the higher quality data. Typically, we find that almost all of our web browsing can be done by transcoding images to a sixth or tenth of their original size, and only rarely do we actually find a object, such as a map, that we need to request a refinement of. Note that alternative HTML-only interfaces can have been invented for supporting non-Java devices such as Windows CE based platforms.

Now we consider streaming image transcoding. The above description is generally applicable to a store-and-forward transcoding proxy. Following, we describe conditions under which it is beneficial for a streamed image transcoder to engage in transcoding. A streamed image transcoder is an image transcoder which starts writing out image data encoded in an output format before having fully read in the complete input stream of bytes corresponding to the entire image encoded in the input format.

In FIG. 12 we illustrate an example of the reasoning behind our algorithm by using a timing diagram. The input image arrives as a stream of bits spaced apart by $1/B_{sp}$. The streaming image transcoder will take a group of G bits for transcoding, incurring a small store-and-forward delay $D_1$. The group of bits are then transcoded into a group of $G_p$ output bits, incurring a delay $D_2$. If $D_2 < D_1$, then the image transcoder can convert each input group G to its corresponding output group $G_p$ before the next input group G needs to be processed. In this case, the streaming image transcoder's internal memory requirement is bounded. However, if $D_2 > D_1$, then the image transcoder will not be able to process input bits fast enough. In this latter case, given a continuous input stream, then the image transcoder's internal memory requirement grows without bound, i.e. the image transcoder's finite-length internal RAM buffers will overflow. Therefore, we desire than the transcoding delay $D_2$ satisfy $D_2 < D_1$. Clearly, $D_1 = G/B_{sp}$. To find $D_2$, let $D_p(S)$=the predicted image transcoding time for an image of S bits ($D_p(S)$ actually depends on other parameters, such as image content and dimension, but we use $D_p(S)$ for simplicity of notation). Then, $D_2 = D_p(S)/(S/G)$. To avoid overflowing the RAM buffer, the group transcoding delay must satisfy $D_p(S)/(S/G) < G/B_{sp}$, or $$D_p(S) < S/B_{ps} \quad \text{(Condition A)}$$

Assuming that Condition A holds true, then the output transcoded groups $G_p$ will be uniformly spaced by a delay equal to $D_1$. The transmission channel can send each transcoded group of bits $G_p$ in time $D_3 = G_p/B_{pc}$. In case i), we illustrate $D_3(i) < D_1$, i.e. each output group $G_p$ can be sent before the next output group is ready for transmission. In case ii), $D_3(ii) > D_1$, so that the output transmission link cannot send the produced bits fast enough to keep the output queue empty. In case ii), the transmission link's output queue grows without bound given a continuous stream of transcoded bits, causing overflow for finite-length link buffers. Therefore, we desire that the delay caused by the transcoded output group size $D_3(i) < D_1$. Clearly, $D_3(i) = G_p/B_{pc}$. To avoid overflowing the transmission link's output buffer, the transcoded output image group size $G_p$ must satisfy $G_p/B_{pc} < G/B_{sp}$, or $$\gamma > B_{ps}/B_{pc} \quad \text{(Condition B)}$$

where $\gamma$=group image compression ratio $G/G_p$, which we assume to be on average equivalent to the overall image compression ratio. In summary, the streamed image transcoder should only perform transcoding when both Condition A and Condition B are satisfied. If the proxy-server link is the bottleneck, i.e. $B_{cp} < B_{pc}$, then Condition B reduces to $\gamma > N$, where N is a number less than 1. Normally, the compression ratio is always greater than 1, so Condition B will always be satisfied. In this case, only Condition A must be satisfied in order for transcoding to not be disadvantageous. In fact, when the proxy-server link is the bottleneck, Condition B could be interpreted as providing an upper bound on the ratio of expansion allowed for a transcoded image, namely $1/\gamma y < B_{pc}/B_{sp}$. Expansion of an image may occasionally be necessary when format conversion is mandatory, e.g. GIF→Palm format. The above equation allows us to determine when such format conversion will increase the chances of buffer overflow, and when format conversion will not cause buffer overflow. For example, if $B_{sp}=1$ bps, $B_{pc}=2$ bps, and $G=1$ bit, then Condition B says that the output group $G_p$ can expand to a maximum of 2 bits. If the client-proxy link is the bottleneck, i.e. $B_{sp > Bp}c$, then Condition B says that the image compression ratio $\gamma$ must be greater than the ratio of proxy-server to client-proxy bandwidths in order for transcoding to be worthwhile. In addition, Condition A must still be satisfied.

It is noted that condition A and condition B are tight bounds that assume that the buffer must never be allowed to overflow. Those skilled in the art recognize that looser constraints may be derived given that images are of finite-length, rather than the continuous stream assumed in the analysis. More relaxed constraints would permit more time for transcoding and/or allow less aggressive compression.

It is thus an aspect of the present invention to provide a method for a transcoding proxy to facilitate browsing between client devices and servers connected via a communication network. The method includes receiving an HTTP GET request from a client devices for an object stored at one of the servers, forwarding the GET request for the object to the server, receiving the object from the servers, examining preferences specified by a user of the client device, examining contents of the object, examining communication network characteristics, choosing a set of transcoding parameters, forming a transcoded form of the object, sending the transcoded form to the client, and/or examining network characteristics including estimating network bandwidth between the server and the proxy as well as between the proxy and the client, and/or estimating delay between the servers and the proxy as well as delay between the proxy and the client device, and/or providing a feedback to the user about a level of transcoding performed on the object, and/or the step of examining including determining the size of the object, and/or determining dimensions of the object, and/or calculating the compression ratio of the object. If the object is of type image, dimensions of the image object are determined by area of the image in square pixels, and the compression ratio is determined by the bpp ratio of the image object. The present invention allows both store-and-forward and streaming transcoding, thus allowing forming a transcoded form before the step of receiving the object from the servers is complete. This method can be applied to JPEG, GIF and other image types. Another aspect of this invention is that it allows sending out the transcoded form before the step of forming a transcoded form of the object is complete.

There are several other considerations that are important. The above examples for the concepts of the present invention are usual for image and video, etc. The wide use of the Internet has shown the value of JPEG and NPEG compressed image data. Audio coded data also needs to be decompressed, mixed with special sound effects, merged with other audio data, edited and processed in the real domain. Similar implementations are performed for other industrial, commercial, and military applications This invention may also be provided as a process, an article of manufacture, apparatus, system, architecture and/or a computer product. For example, it may be implemented as an article of manufacture comprising a computer usable medium having computer readable program code means embodied therein for causing a computer to perform the methods of the present invention.

It is noted that although the description of the invention is made for particular arrangements of steps, the intent and concept of the present invention are suitable and applicable to other arrangements. For example, the invention is also adaptable to any browser although embodiment is directed towards web browsing only. Although primary consideration is given to dynamic implementations, the invention may be employed with a combination of static, quasi-dynamic and dynamic implementations. It will be clear to those skilled in the art that other modifications to the disclosed embodiments can be effected without departing from the spirit and scope of the invention. Thus, all variations and modifications are intended to be included within the scope of the invention as defined in the appended claims.

What is claimed is:

1. A method for a transcoding proxy to facilitate browsing between a plurality of client devices and a plurality of servers connected via a communication network, the method comprising:

receiving a request from one of the client devices for an object stored at one of the servers, forwarding the request for the object to said one of the servers, receiving the object from said one of the servers, examining preferences specified by a user of said one of the client devices, examining contents of the object, examining communication network characteristics, wherein the network characteristics includes bandwidth, and examining network characteristics includes estimating network bandwidth between said one of the servers and the proxy as well as between the proxy and said one of the clients, choosing a set of transcoding parameters, forming a transcoded form of the object, and sending the transcoded form to said one of the clients.

2. A method for a transcoding proxy to facilitate browsing between a plurality of client devices and a plurality of servers connected via a communication network, the method comprising:

receiving a request from one of the client devices for an object stored at one of the servers, forwarding the request for the object to said one of the servers, receiving the object from said one of the servers, examining preferences specified by a user of said one of the client devices, examining contents of the object, examining communication network characteristics, wherein the network characteristics includes delay, and examining network characteristics includes estimating delay between said one of the servers and the proxy as well as delay between the proxy and said one of the clients, choosing a set of transcoding parameters, forming a transcoded form of the object, and sending the transcoded form to said one of the clients.

3. A method as recited in claim 1, further comprising providing feedback to the user about a level of transcoding performed on the object to form the transcoded form.

4. A method as recited in claim 1, wherein the step of examining includes determining the size of the object.

5. A method as recited in claim 1, wherein the object is of type image forming an image object, and the method further comprises:
   determining dimensions of the image object, and
   calculating the compression ratio of the image object.

6. A method as recited in claim 5, wherein the dimensions of the image object are determined by area of the image in square pixels, and the compression ratio is determined by the bpp ratio of the image object.

7. A method as recited in claim 1, wherein the step of forming a transcoded form employs dynamic adaptation.

8. A method as recited in claim 1, wherein the step of forming a transcoded form is started before the step of receiving the object from said one of the servers is complete.

9. A method as recited in claim 8, wherein the received object type is of type JPEG forming a JPEG object.

10. A method as recited in claim 9, wherein the step of forming a transcoded form includes performing JPEG-to-JPEG image transcoding and the step of sending the transcoded form starts writing out at least one MCU of JPEG-encoded output image data before the step of receiving the object is complete.

11. A method as recited in claim 1, wherein the step of sending out the transcoded form is started after processing an initial fraction of the received object, and before the step of receiving the image object from said one of the servers is complete.

12. A method as recited in claim 1, wherein the step of sending out the transcoded form is started before the step of forming a transcoded form of the object is complete.

13. A method for a proxy to form a transcoded form of an object received from a server in satisfaction of a request from a client for an object available from the server, the method comprising:
   dynamically adapting parameters for transcoding the object for the client, wherein adapting includes examining the contents of the object and gathering present network characteristics between the server and the proxy and between the proxy and client,
   forming a transcoded form of the object,
   predicting at least one parameter of the transcoded form of the object, and
   sending the transcoded form to the client.

14. A method as recited in claim 13, wherein the step of adapting parameters includes determining at least one characteristic of the object.

15. A method as recited in claim 14, wherein one characteristic is an object-header, the object-header providing information about the size and the type of the object.

16. A method as recited in claim 15, further comprising comparing the size of the object to a threshold parameter called "size_threshold".

17. A method as recited in claim 13, wherein one of the characteristics is network bandwidth and the step of adapting includes estimating network bandwidth between the server and the proxy as well as between the proxy and the client.

18. A method as recited in claim 17, wherein the transcoded form is dependent upon the estimated bandwidth.

19. A method as recited in claim 13, wherein the step of adapting includes retrieving preferences of the user, and wherein the transcoded form is dependent upon the preferences.

20. A method as recited in claim 13, wherein the object is of type image forming an image object, and examining the content of the image object includes determining dimensions of the image.

21. A method as recited in claim 20, wherein the step of adapting is dependent upon determining the compression ratio of the image object.

22. A method of claim 21, wherein the type of image object is GIF and wherein the step of adapting is dependent upon comparing the compression ratio against a predetermined policy threshold called "gif_threshold".

23. A method as recited in claim 13, wherein the transcoded form is the same as an original form of the object.

24. A method as recited in claim 13, wherein at least one of the parameters includes a size of the transcoded form.

25. A method as recited in claim 13, wherein at least one of the parameters includes the time spent in transcoding the object.

26. A method for predicting parameters of a transcoded form of an object, the object having an initial size and dimension, and the object being received from a server in satisfaction of a request from a client for the object, the method comprising:
   computing the bpp ratio of the object,
   gathering a set of statistics of a plurality of previously transcoded objects,
   employing the set of statistics and the bpp ratio for predicting the parameters, wherein at least one of the parameters is size and the set of statistics includes sizes of a plurality of previously transcoded objects statistics.

27. A method for predicting parameters of a transcoded form of an object, the object having an initial size and dimension, and the object being received from a server in satisfaction of a request from a client for the object, the method comprising:
   computing the bpp ratio of the object,
   gathering a set of statistics of a plurality of previously transcoded objects, wherein the object is of type image and wherein the set of statistics includes image quality,
   employing the set of statistics and the bpp ratio for predicting the parameters.

28. A method as recited in claim 27, wherein the plurality of previously transcoded objects are chosen from a predetermined benchmark suite of images.

29. A method as recited in claim 26, wherein the step of employing uses dynamically updating the set of statistics using the statistics of the currently transcoded object.

30. A method as recited in claim 26, wherein at least one of the parameters is a duration for forming a transcoded form of an object and the set of statistics includes the duration for forming a plurality of previously transcoded objects.

31. A transcoding proxy system for facilitating browsing between a plurality of clients and a plurality of servers connected via a communication network, the proxy comprising
   an HTTP proxy engine to receive a request from one of the clients for an object stored at one of the servers, and to fetch the object from said one of the servers,
   an object transcoder to form a transcoded form of the object using a set of parameters for transcoding,
   a dynamic policy module to determine the set of parameters of transcoding,
   an image size and delay predictor module to gather characteristics of the object,
   a user preference module to gather quality preferences specified by a user of said one of the clients, and a bandwidth estimation module to estimate available network bandwidth, wherein dynamic policy module dynamically adjusting the parameters of transcoding using the input received from the image size and delay predictor module, user preferences module, and bandwidth estimation module for the purpose of improving satisfaction for the user, and the transcoding system providing feedback to the user about the level of transcoding performed.

32. A system as recited in claim 31, wherein the user preferences module further collecting the characteristics such as display size, resolution, & CPU speed of said one of the devices, and providing those characteristics to the dynamic policy module.

33. A system as recited in claim 31, wherein the bandwidth estimation module collecting traces of previously established network connections between said one of the servers & the proxy, collecting traces of previously established network connections between the proxy and said one of the clients, and estimating the object download time by performing statistical analysis on the collected traces.

34. A system as recited in claim 33, wherein the statistical analysis used for estimating bandwidth between said one of the servers and the proxy is based on computing a statistical measure such as median, mean, or mode of download times of previously fetched objects as determined from the collected traces.

35. A system as recited in claim 33, wherein the statistical analysis used for estimating bandwidth between the proxy and said one of the clients is based on computing aggregate bandwidth of all active connections between the proxy and said one of the clients.

36. A system as recited in claim 31, further comprising displaying a slide bar on said one of the client's display for collecting the user specified preferences.

37. A system as recited in claim 31, wherein the user of said one of the clients can specify the tradeoff between download time and data quality through the use of a graphical user interface with a slide bar.

38. A system as recited in claim 36, whereby the user of said one of the clients can specify through the use of a graphical user interface with a slide bar the tradeoff between download time and image quality including a specific switch to select color or gray scale as the desired output form.

39. A system as recited in claim 36, whereby the user of said one of the clients can specify through the use of a graphical user interface with a slide bar, the desire to maintain a target response time such that the system automatically reduces data quality (and hence data download size) to compensate for dynamic variations in bandwidth to said one of the clients.

40. A system as recited in claim 36, whereby the graphical user interface slider bar is also used as an output interface for showing the optimal choice of transcoding parameters to the user.

41. An article of manufacture comprising a computer usable medium having computer readable program code means embodied therein for causing dynamic adaptation of transcoded form of an object in a transcoding proxy, the computer readable program code means in said article of manufacture comprising computer readable program code means for causing a computer to effect:

a proxy receiving an object associated with a user from a server, determining parameters of the object, retrieving preferences of the user, gathering present network characteristics, obtaining transcoding policy thresholds, performing a policy decision based upon object parameters, user preferences, network characteristics, and policy thresholds, forming a transcoded object, providing feedback of a level of transcoding performed on the object to the user, sending the transcoded object to the user.

42. An article of manufacture comprising a computer usable medium having computer readable program code means embodied therein for causing a transcoding proxy to facilitate browsing between a plurality of client devices and a plurality of servers connected via a communication network, the computer readable program code means in said article of manufacture comprising computer readable program code means for causing a computer to effect:

receiving a request from one of the client devices for an object stored at one of the servers, forwarding the request for the object to said one of the servers, receiving the object from said one of the servers, examining preferences specified by a user of said one of the client devices, examining contents of the object, examining communication network characteristics, choosing a set of transcoding parameters, forming a transcoded form of the object, providing feedback to the user about a level of transcoding performed on the object to form the transcoded form, and sending the transcoded form to said one of the clients.

43. An article of manufacture as recited in claim 42, the computer readable program code means in said article of manufacture further comprising computer readable program code means for causing a computer to effect determining dimensions of the object, and calculating the compression ratio of the object.

44. An article of manufacture as recited in claim 42, the computer readable program code means in said article of manufacture further comprising computer readable program code means for causing a computer to effect starting the step of forming a transcoded form before the step of receiving the object from said one of the servers is complete.

45. A computer program product comprising a computer usable medium having computer readable program code means embodied therein for causing a proxy to form a transcoded form of an object received from a server in satisfaction of a request from a client for an object available from the server, the computer readable program code means in said computer program product comprising computer readable program code means for causing a computer to effect:

dynamically adapting parameters for transcoding the object for the client, forming a transcoded form of the object, gathering present network characteristics between the server and the proxy and between the proxy and the client adapting parameters for transcoding based upon the estimated bandwidth and preferences of the user, and sending the transcoded form to the client.

* * * * *